July 28, 1959 — T. A. STEHLIN — 2,896,905
PREFABRICATED VALVE
Filed Sept. 13, 1954 — 3 Sheets-Sheet 1

T. A. STEHLIN,
INVENTOR.

BY *OO Martin*

ATTORNEY.

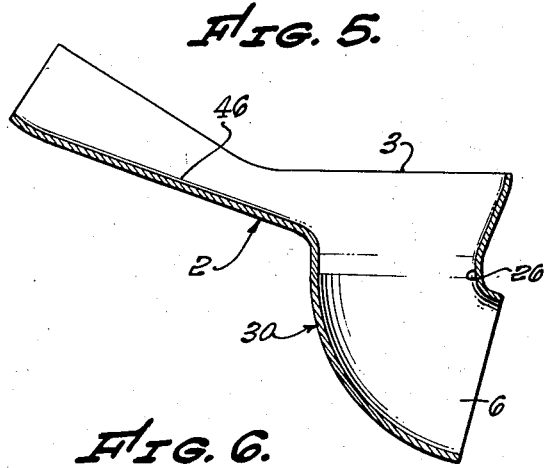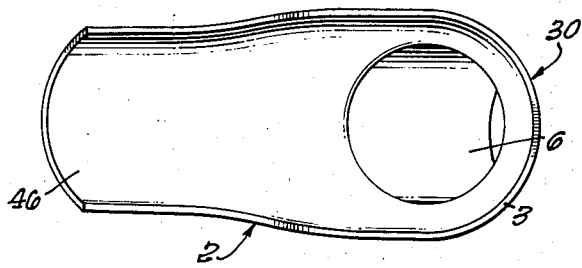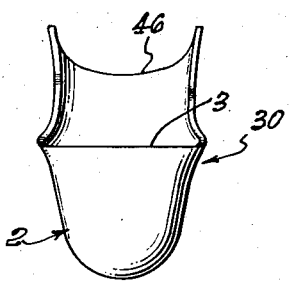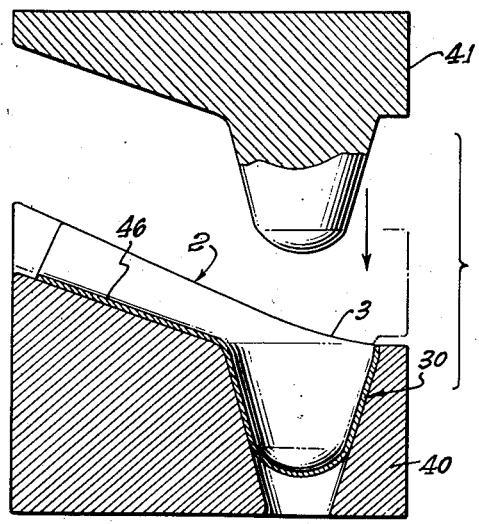

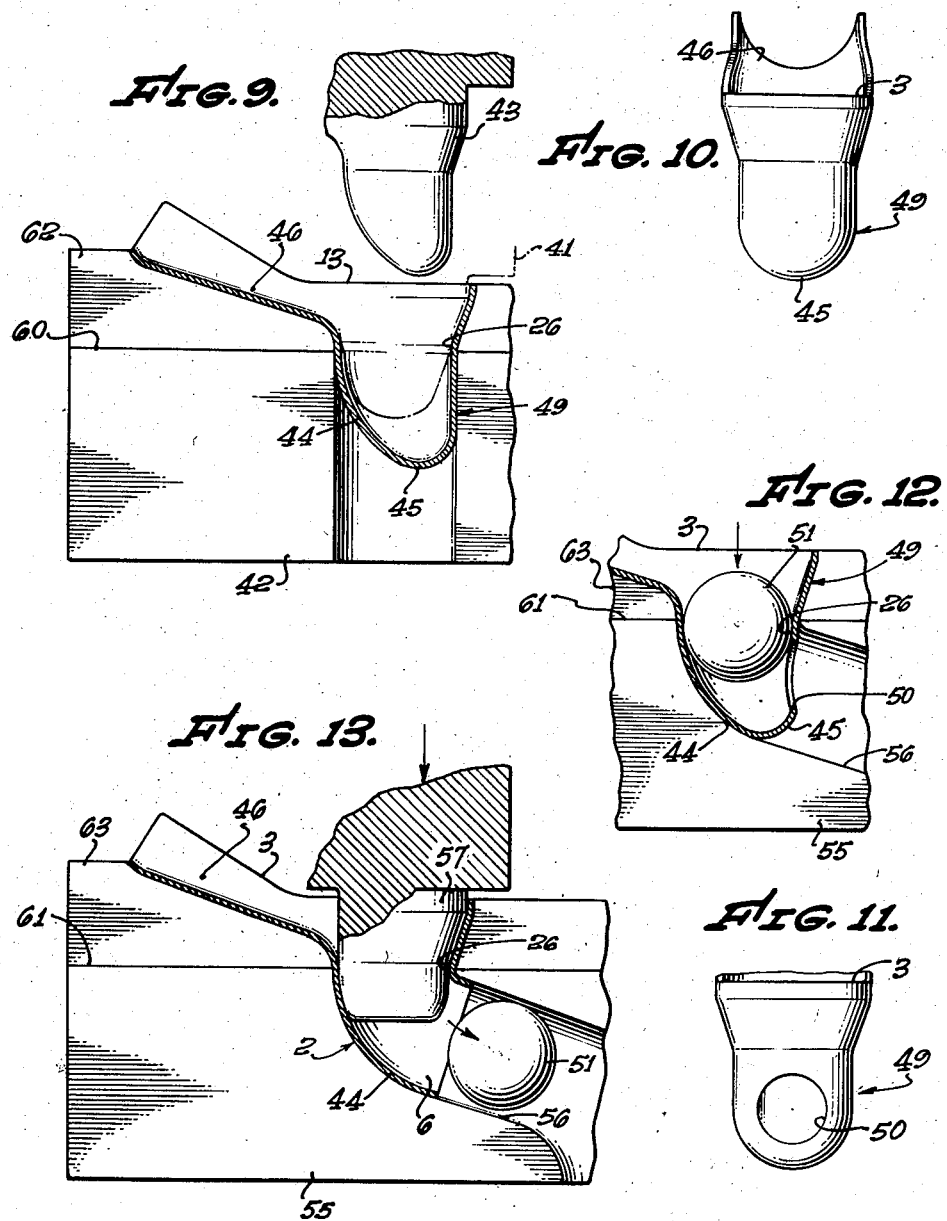

United States Patent Office 2,896,905
Patented July 28, 1959

2,896,905

PREFABRICATED VALVE

Theodore A. Stehlin, Pasadena, Calif.

Application September 13, 1954, Serial No. 455,645

7 Claims. (Cl. 251—366)

The present invention relates to valves and refers particularly to the manner in which valve bodies or casings, as well as other parts of the valves, may be prefabricated and assembled and the assembled parts rigidly combined.

Valve bodies or casings, as well as other parts of a valve, are generally made from metal which is cast or drop-forged, whereupon a considerable amount of machining is necessary in order correctly to shape and smoothly to finish the working surfaces of the casings and of such parts.

While valves constructed in this manner have generally been accepted as entirely satisfactory, there are conditions where the weight of such valves and the roughness of the unfinished inner surfaces thereof are objectionable. This is particularly a problem which the food industry is endeavoring to solve, the problem of producing a valve the inner surface whereof is smooth and unbroken throughout the extent thereof and in which is found no corners, grooves or pockets within which matters flowing through the valve may settle and decay. Many attempts have for such reasons been made to prefabricate valve casings and parts, using pieces of tubular material and shaping the ends of such tubular parts as may be required correctly to fit the parts together, whereupon the assembled parts are welded together; but while in very simple types of valves such method of prefabrication may be found practical, it is generally found that valves so constructed include so many irregularly shaped portions and parts that the difficulty and cost of shaping each tubular part renders the method of prefabrication commercially impractical.

It is, in view of the foregoing, the general object of the present invention to provide a prefabricated valve the parts of which may be manufactured at small cost whereupon the parts may be quickly and conveniently assembled and externally welded or soldered together to form the complete valve. More particularly it is the object of the invention to make the valve casing consisting of an upper and a lower member which can be correctly shaped in a punch press from thin sheet metal of the kind best suited to the purposes for which the valve is designed, or in a mold in cases where molded parts are preferred. Another object of the invention is to provide a prefabricated valve casing the entire inner surface of which is smooth and the interior passages of which are arranged in such smooth and unbroken continuation that every portion of the interior surface may be thoroughly cleansed. All danger of material passing through the valve becoming settled within the valve gradually to ferment or rot is in this manner eliminated. These and other objects of the invention will be better understood from the following detailed description, particularly when reference is had to the accompanying drawings in which preferred forms of the invention are illustrated.

In the drawings:

Figs. 5 and 6 show the shape of the lower member of the casing;

Fig. 7 illustrates the first step in forming the lower member in a press;

Fig. 8 is an end view of the member as it appears after the first forming operation.

Fig. 9 is illustrative of the second step in the forming operations;

Fig. 10 shows the member as it appears when removed from the die;

Fig. 11 shows the manner in which the member is perforated for the purpose of the final step in the forming operations; and Figs. 12 and 13 are illustrative of this final operation.

The valve casing of the invention consists of an upper member 1 and a lower member 2. The dividing line 3 between the two members extends substantially through the middle of the casing.

Figure 1:
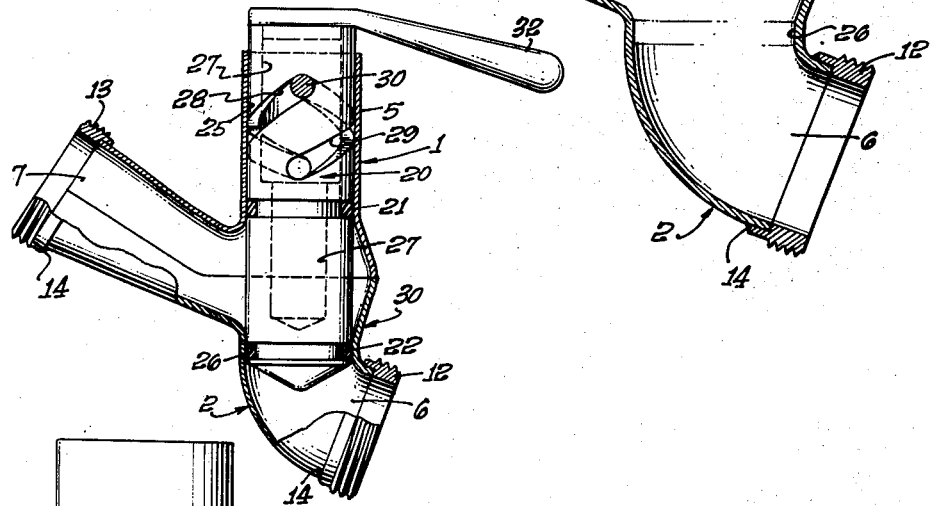
Fig. 1 is a side elevational view taken through the vertical center of a valve embodying the invention.
Figure 4:
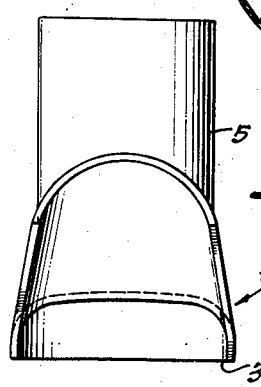

The assembled valve illustrated in Fig. 1 of the drawings is of the poppet type and it is so irregular in shape that it would be very expensive and difficult to make and to assemble the parts thereof from tubular stock as has heretofore been proposed. It would also be very difficult in assembling such tubular parts to maintain the parts correctly alined while uniting them by a welding operation. The two members of the casing are for these reasons made in a punch press from thin sheet material to create the shapes best shown in Figs. 2 to 6 of the drawings thereby to produce a simple sanitary casing of sufficient strength. When the blanks of the members have been cut approximately to the correct size and shape and the two members have been formed in such manner, it is merely required by a grinding operation correctly to finish the adjacent edges of the members.

Figure 3:
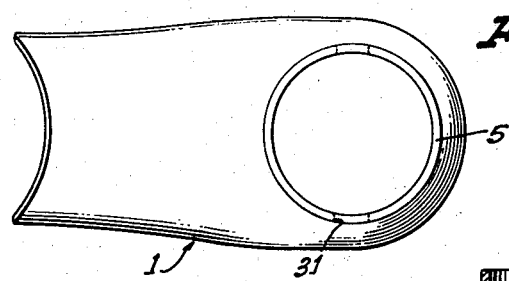
Fig. 3 and 4 are top and end views of the upper member of the casing.
Figure 2:
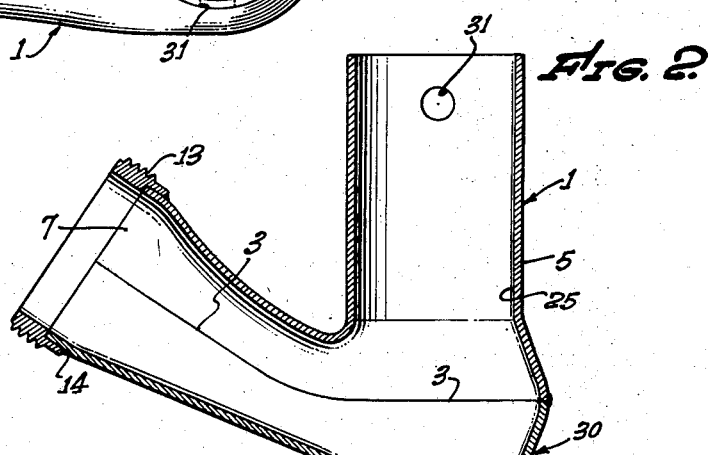
Fig. 2 is a similar view, on a larger scale of the valve casing.

As indicated in the drawings, the casing has been formed from such thin sheet metal making it advisable in cases where the valve is to be cut into a pipe line, tightly to mount ferrules 12, 13 on the ends of the assembled casing whereupon these ferrules may be rigidly secured in position thereon by simple welding operation, as indicated at 14 in Fig. 2. This method of manufacturing the valve casing has a further advantage that, when the ferrules are pressed in position on the ends of the casing, they assist in maintaining the casing members snugly and correctly combined and so materially simplify the operation of welding the members together. Since all the welding is done on the outer surface of the casing, it is seen that the inner surface thereof is not disturbed and that for this reason it should generally not be necessary to touch up any portion of the inner valve surface. The preferred shape of the assembled valve casing, illustrated in Fig. 2 of the drawings, includes a tubular cylindrical body portion 5, the lower end of which is outwardly curved to provide a discharge passage 6 laterally extending therefrom at an angle of about 60°. The inlet passage 7 of the casing communicates with the cylindrical passage through the body directly above the curved discharge passage 6. It is seen that, when the casing is so shaped, the inlet and discharge passages are substantially in continued axial alinement.

It was above stated that the valve illustrated in the drawings is of the poppet type and it is important to note that the poppet 20, shown in Fig. 1, is cylindrical in shape fittingly to slide within the body 5. This poppet is at the lower end thereof and also a distance above this end shown grooved to provide seats for O-rings 21, 22 which, when the poppet is fully advanced within the casing, reach contact with seats 25, 26 of the casing. The poppet is, at 27 for the purpose of such advance movement, shown internally recessed from the open top thereof nearly to the bottom and helical slots 28, 29 are cut through the walls of the poppet whereupon a pin 30 is entered through a perforation 31 of the casing and extended through the slots of the poppet to lock the latter in position within the casing. Suitable means, such as a handle 32, is secured to the upper end of the poppet for manual rotation thereof to impart axial movement of thereto within the body of the casing. This handle may be fastened in position in any suitable manner.

The upper part of the valve casing is readily formed in a punch press to provide the tubular, cylindrical guide for the poppet 20. No particular difficulty is encountered in performing the operation of drawing the material into the cylindrical shape shown in Figs. 2 to 4 of the drawings.

The lower member 2 of the casing, on the other hand, presents a shape which it has heretofore been found commercially impossible to produce in a punch press so far as I have been able to ascertain. This lower casing member, together with the hereinafter described novel method of producing the casing constitutes, perhaps, the most important feature of the invention. The method I have devised for correctly forming the lower member of the casing includes the following steps.

The blank to be formed is first placed in a die 40, see Fig. 7, for registration with a punch 41 which, as usual, is mounted on the ram of a press and this punch and die combination is shaped to produce the initial shape illustrated in Figs. 7 and 8. The partly formed member is then loosely placed in a second die 42, as shown in phantom outline and a punch 43 forces the lower end of the member into the die further to shape the member, as indicated at 44, 45, and to complete the semi-circular shape 46 of the end of the member substantially as indicated in Fig. 10 of the drawings. No particular difficulty has been encountered in producing this shape which, of course, is very far from the finished shape illustrated in Fig. 1 and it has been found necessary to devise novel means to complete the forming of the valve part. After much experimenting I have found it possible to perform these additional operations in the following manner.

A hole 50 is first cut in the partly finished lower valve member 49, see Fig. 11, whereupon the member is placed in a die 55 which may be very similar to the die 42 of Fig. 9, except that an outlet passage 56 is cut into the die substantially in axial alinement with the hole 50 of the member when the latter is seated in the die as indicated in Fig. 12. A ball 51 is now placed in the member, thereupon a punch 57 is caused to enter the die and to descend squarely upon the ball, by pressure to force this ball out into the passageway 56 in so doing to draw the lower end of the member into its final shape, substantially as indicated in Fig. 13. The ball will then be free to roll out through the passage 56. Not only have I found it possible to form the lower member of the casing in this manner but it is important to note that I have been able to perform these forming operations in very hard material such as stainless steel. This metal has been found ideally suited for use in valves designed to control the flow of food products.

The importance of the shapes of the two members of the valve should now readily be appreciable to anyone familiar with the art. By reference to Figs. 1 and 2 of the drawings, it is seen that the passage through the body 5 of the casing, in which the poppet is seated to slide, is in axial alinement with the seat 26 in the lower part thereof. When the members are so shaped, it is found that a mandrel may be placed within the assembled casing to maintain the valve seats 25, 26 for the poppet in axial alinement during the time that a welding operation is applied to the outer surfaces of the casing to unite the members. When this mandrel then is removed it is found that the casing is ready for receiving the valve parts and that it will function perfectly. Means should be provided for mounting the valve in the pipe line it is supposed to serve and the ferrules 12, 13 serve this purpose.

It is seen from the foregoing description that I have devised a simple way of forming sheet metal into a very odd shape to produce a trouble-free, easy to clean valve for transmitting food products through a pipe line. But while I have illustrated a preferred form of valve it is not intended thereby to limit the invention to the arrangements and shapes exactly as shown and described but right is reserved to embody modifications therein within the scope of the claims hereto appended.

It may, for example, in some cases be found advantageous to swing the valve inlets and outlets out of alinement. This may readily be done by dividing the dies 42 and 55 on lines 60, 61, respectively. When so divided, it is found that the upper parts 62, 63 of the dies may be rotated on the lower parts thereof into any relative angular position best suited for a particular installation.

I claim:

1. A sheet metal valve casing comprising: first and second casing members, said first member having a vertically directed cylindrical body portion, the inner wall of which constitutes a first seamless valve seat, said second member having an outlet passage extending at an angle to the axis of said cylindrical body portion, said first and second casing members being so formed as to mate and when secured together they define an inclined inlet passage which is in communication and in substantial axial alignment with said outlet passage, said second casing member having an inner wall between the inlet and outlet passages forming a second seamless valve seat in axial alignment with said first valve seat.

2. A device as set forth in claim 1 in which the two valve seats are of the same diameter.

3. A device as set forth in claim 1 in which the inlet passage is set at an angle of about 60° to the cylindrical body portion.

4. A device as set forth in claim 1 in which the dividing line between the two members of the casing extends axially through the inlet passage and perpendicularly across the cylindrical body portion of the casing.

5. A device as set forth in claim 1 in which the casing members are externally welded together along the dividing line between the members.

6. A device as set forth in claim 1 in which the wall of the casing between the two valve seats is outwardly curved.

7. A device as set forth in claim 1 in which ferrules are placed on the inlet and outlet ends of the casing to maintain the assembled members correctly alined, the casing members and the ferrules thereon being externally welded together.

References Cited in the file of this patent

UNITED STATES PATENTS

| | | |
|---|---|---|
| 1,638,546 | Murray | Aug. 9, 1927 |
| 2,269,404 | Haven | Jan. 6, 1942 |

FOREIGN PATENTS

| | | |
|---|---|---|
| 779,272 | France | Jan. 14, 1935 |
| 838,211 | France | Nov. 28, 1938 |
| 875,133 | France | June 8, 1942 |
| 891,961 | France | Dec. 17, 1943 |
| 657,056 | Great Britain | Sept. 12, 1951 |